United States Patent
Udayaadithya et al.

(10) Patent No.: US 11,010,232 B2
(45) Date of Patent: May 18, 2021

(54) ADAPTIVE SYSTEM AND A METHOD FOR APPLICATION ERROR PREDICTION AND MANAGEMENT

(71) Applicant: Mphasis Limited, Bangalore (IN)

(72) Inventors: Avadhanam Udayaadithya, Bangalore (IN); Jai Ganesh, Bangalore (IN); Divay Garg, Saharanpur (IN); Aravindhan Arunagiri, Trichy (IN); Bishwajeet Mondal, Ghaziabad (IN); Aveek Choudhury, Kolkata (IN); Faustina Selvadeepa, Bangalore (IN)

(73) Assignee: Mphasis Limited

( * ) Notice: Subject to any disclaimer, the term of this patent is extended or adjusted under 35 U.S.C. 154(b) by 78 days.

(21) Appl. No.: 16/216,048

(22) Filed: Dec. 11, 2018

(65) Prior Publication Data

US 2019/0179692 A1 Jun. 13, 2019

(30) Foreign Application Priority Data

Dec. 12, 2017 (IN) .............................. 201741044615

(51) Int. Cl.
*G06F 11/00* (2006.01)
*G06F 11/07* (2006.01)
(Continued)

(52) U.S. Cl.
CPC ............ *G06F 11/079* (2013.01); *G06F 9/542* (2013.01); *G06F 9/547* (2013.01); *G06F 11/008* (2013.01);
(Continued)

(58) Field of Classification Search
CPC .. G06F 11/079; G06F 11/008; G06F 11/0793; G06F 11/302; G06F 11/3065;
(Continued)

(56) References Cited

U.S. PATENT DOCUMENTS

2003/0139917 A1* 7/2003 Hardwick ........... G06F 11/3457
703/21
2012/0166869 A1 6/2012 Young et al.
(Continued)

FOREIGN PATENT DOCUMENTS

EP 3296876 A1 3/2018

OTHER PUBLICATIONS

Search Report for European Application No. 18211943.8 dated Apr. 24, 2019; 3 pages.
(Continued)

*Primary Examiner* — Joseph D Manoskey
(74) *Attorney, Agent, or Firm* — Lerner, David, Littenberg, Krumholz & Mentlik, LLP

(57) ABSTRACT

A system and a method for predicting errors and failure of an application and performing preventive maintenance measures is disclosed. The present invention provides for generating timestamped event logs and extracting data which includes application Id, service Id, user Id, host, error information, resource information, user request data and frequently used execution sequences of associated software components. Further, multiple user requests are modelled based on information extracted from the timestamped event logs and an execution sequence of associated software components is created based on data extracted from timestamped event logs. Further, an execution scheme is generated based on modelled user requests, execution sequence of associated applications and resource status. Yet further, propensity of failure of application is predicted based on the timestamped event logs, user requests, execution sequence of associated applications, resource status and execution scheme of the application by applying a holistic technique.

27 Claims, 5 Drawing Sheets

(51) Int. Cl.
  *G06N 7/08*    (2006.01)
  *G06N 5/00*    (2006.01)
  *G06F 11/34*   (2006.01)
  *G06F 9/54*    (2006.01)
  *G06F 11/30*   (2006.01)

(52) U.S. Cl.
  CPC ........ *G06F 11/0793* (2013.01); *G06F 11/302* (2013.01); *G06F 11/3065* (2013.01); *G06F 11/3068* (2013.01); *G06F 11/3072* (2013.01); *G06F 11/3414* (2013.01); *G06F 11/3433* (2013.01); *G06F 11/3438* (2013.01); *G06F 11/3447* (2013.01); *G06F 11/3476* (2013.01); *G06N 5/003* (2013.01); *G06N 7/08* (2013.01); *G06F 2201/835* (2013.01); *G06F 2201/86* (2013.01)

(58) Field of Classification Search
  CPC .............. G06F 11/3068; G06F 11/3072; G06F 11/3414; G06F 11/3433; G06F 11/3438; G06F 11/3447; G06F 11/3476; G06F 9/542; G06F 9/547; G06F 2201/835; G06F 2201/86; G06N 5/003; G06N 7/08
  See application file for complete search history.

(56) References Cited

U.S. PATENT DOCUMENTS

| | | |
|---|---|---|
| 2017/0006135 A1 | 1/2017 | Siebel et al. |
| 2017/0322120 A1* | 11/2017 | Wang .................. G01M 99/008 |
| 2018/0113773 A1* | 4/2018 | Krishnan ............ G06F 11/0793 |
| 2019/0095265 A1* | 3/2019 | Dome .................. H04L 41/147 |
| 2020/0057689 A1* | 2/2020 | Farahat .............. G06Q 30/0283 |

OTHER PUBLICATIONS

Decision to Grant a European Patent for Application No. 18211943.8 dated Sep. 3, 2020; 2 pages.

* cited by examiner

ADAPTIVE SYSTEM AND A METHOD FOR APPLICATION ERROR PREDICTION AND MANAGEMENT

FIELD OF THE INVENTION

The present invention relates generally to the field of error detection and management of computer applications. More particularly, the present invention relates to a system and a method to effectively predict errors and failure of an application in advance and provide preventive maintenance measures by analysing root cause of errors using a holistic approach.

BACKGROUND OF THE INVENTION

Software applications are designed to implement a predefined set of operations to achieve one or more objectives or functionalities when executed in response to one or more user request(s). A user request is representative of a functionality desired from the software application. Generally, a software application may be dependent on one or more software components which include other applications and one or more services associated with the other applications, software services, and service routine calls. Each component associated with the software application is further dependent on various resources like processing facilities, storage etc. to perform its respective function. The application is expected to exhibit intended behavior under normal operating conditions of the associated components and resources. Further, said application deployed in real environment is expected to operate as per agreed performance levels, also known as service levels. Some performance levels of the application include handling of input, application execution time, resource (computation or storage) utility, application error incidence, availability, ease-of-use, desired output, monetary value of the application.

Any unintended event associated with the operation of the application is generally due to abnormalities in one or more of the components and/or resources in isolation or in tandem, which prevents the application to perform its tasks in an intended manner. The unintended behavior of an application is logged as 'Error'. The application encountering frequent errors leads to loss of quality of service and downtime of the application, leading to deviation of the application from the accepted service level. In order to resolve the errors and maintain the reliability of the software application, said deviation of the application performance must be monitored.

Existing methods mostly predict the errors which are predefined during the application development phase. However, it has been observed that existing methods fail to address run-time errors including inconsistencies between interdependent applications and errors due to external factors such as user load. Further, majority of existing error prediction methods assume errors to occur in isolation and independent of each other. However, cascading of any error in applications having networked components over a series of associated applications, where error in one component may impact one or more associated components are less considered.

In light of the above drawbacks, there is a need for a system and a method which effectively predicts errors and failures of an application in advance and performs preventive maintenance measures using a holistic approach. There is a need for a system and a method which predicts the occurrence of errors observed through various aspects independently and in synergy. Further, there is a need for a system and a method which identifies erroneous components associated with the application along with pattern of errors occurring in synergy on execution of said associated components. Furthermore, there is a need for a system and a method which can reduce overall management efforts of an application infrastructure. Yet further, there is a need for a system and a method which can reduce downtime caused due to application and/or Infrastructure failures.

SUMMARY

In various embodiments of the present invention, a method for predicting errors and failures in a primary application and providing preventive maintenance measures is provided. The method is implemented by at least one processor executing program instructions stored in a memory, the method comprises generating, by the processor, timestamped event logs by converting one or more sequence of events associated with the primary application using one or more parsing techniques. The method further comprises modelling, by the processor, multiple user requests. The multiple user requests are modelled based on an arrival time and required functionality associated with each user request using data extracted from the timestamped event logs. Further, the method comprises creating, by the processor, one or more execution sequences of software components associated with the primary application based on the generated timestamped event logs. Furthermore, the method comprises generating, by the processor, an execution scheme for the software components associated with the primary application based on the modelled user requests, the execution sequence and a status of resource components. Yet further, the method comprises predicting, by the processor, a propensity of failure of the primary application based on the timestamped event logs, the modelled user requests, the one or more execution sequences, a resource status and the execution scheme. Finally, the method comprises analyzing, by the processor, the predicted failures and actual failures extracted from the timestamped event logs to provide preventive maintenance measures.

In various embodiments of the present invention, a system for predicting errors and failures in a primary application and providing preventive maintenance measures is provided. The system interfaces with a primary application server hosting the primary application. The system comprises a memory storing program instructions, a processor configured to execute program instructions stored in the memory, and an application management engine in communication with the processor. The system is configured to generate timestamped event logs by converting one or more sequence of events associated with the primary application using one or more parsing techniques. Further, the system is configured to model multiple user requests, where the multiple user requests are modelled based on an arrival time and required functionality associated with each user request using data extracted from the timestamped event logs. Furthermore, the system is configured to create one or more execution sequences of software components associated with the primary application based on the generated timestamped event logs. Yet further, the system is configured to generate an execution scheme for the software components associated with the primary application based on the modelled user requests, the execution sequence and a status of resource components. Yet further, the system is configured to predict a propensity of failure of the primary application based on the timestamped event logs, the modelled user requests, the one or more execution sequences, a resource status and the execution scheme. Finally, the system is configured to analyze the predicted failures and actual failures extracted from the timestamped event logs to provide preventive maintenance measures.

In various embodiments of the present invention, a computer program is provided. The computer program product comprises a non-transitory computer-readable medium having computer-readable program code stored thereon, the computer-readable program code comprising instructions that, when executed by a processor, cause the processor to generate timestamped event logs by converting one or more sequence of events associated with the primary application using one or more parsing techniques. Further, multiple user requests are modelled. The multiple user requests are modelled based on an arrival time and required functionality associated with each user request using data extracted from the timestamped event logs. Furthermore, one or more execution sequences of software components associated with the primary application are created based on the generated timestamped event logs. Yet further, an execution scheme for the software components associated with the primary application is generated based on the modelled user requests, the execution sequence and a status of resource components. Yet further, a propensity of failure of the primary application is predicted based on the timestamped event logs, the modelled user requests, the one or more execution sequences, a resource status and the execution scheme. Finally, the predicted failures and actual failures extracted from the timestamped event logs are analyzed to provide preventive maintenance measures.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for predicting errors and failure of an application in advance and perform preventive maintenance measures by implementing a holistic approach. In particular, the present invention provides for generating timestamped event logs, extracting data which includes, but is not limited to, application Id, service Id, user Id, host, error information, resource information, user request data and frequently used execution sequences of associated software components. Further, the invention provides for modelling of multiple user requests with respect to time and requirements based on information extracted from the timestamped event logs. Furthermore, the invention provides for creating an execution sequence of associated software components based on data extracted from the timestamped event logs. The invention, further provides for generating an execution scheme for the software components based on the modelled user requests, execution sequence of associated applications and resource status. Yet further, the present invention provides for predicting propensity of failure of the application based on the timestamped event logs, user requests, execution sequence of associated applications, resource status and execution scheme of the application by applying a holistic technique.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
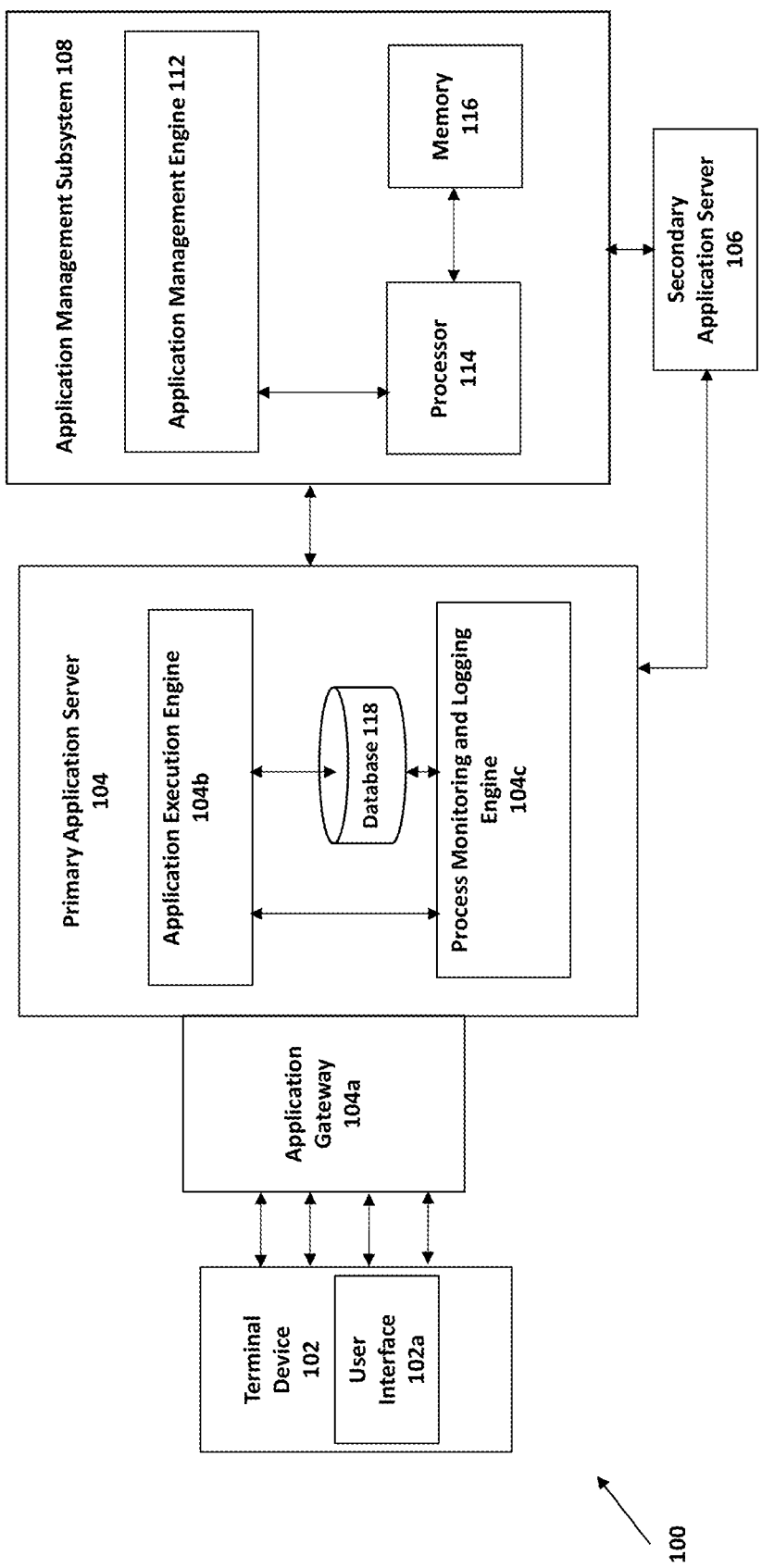
FIG. 1 illustrates a block diagram of a system environment for predicting errors and failures in an application and providing preventive maintenance measures, in accordance with various embodiments of the present invention.

FIG. 1 illustrates a block diagram of a system environment for predicting errors and failures in an application and providing preventive maintenance measures, in accordance with various embodiments of the present invention. Referring to FIG. 1, in an embodiment of the present invention, the system environment 100 comprises a terminal device 102, a primary application server 104 hosting a primary application, a secondary application server 106 hosting one or more secondary applications associated with primary application, and an application management subsystem 108.

In various embodiments of the present invention, the terminal device 102, may include but is not limited to a smart phone, a computer, a tablet, a microcomputer or any other wired or wireless processing device. In an exemplary embodiment of the present invention, the terminal device 102 interfaces with the primary application server 104 and the secondary application server 106 over a communication channel (not shown). The communication channel may include a physical transmission medium, such as, a wire, or a logical connection over a multiplexed medium, such as, a radio channel in telecommunications and computer networking. The examples of radio channel in telecommunications and computer networking may include a Local Area Network (LAN), a Metropolitan Area Network (MAN), and a Wide Area Network (WAN). In particular, as shown in FIG. 1, the terminal device 102 interfaces with the primary application server 104 via a user interface 102a through the application gateway 104a. In another exemplary embodiment of the present invention, the terminal device 102, may request for one or more functionalities of the primary application from the primary application server 104 via a web browser.

In various embodiments of the present invention, examples of primary application server 104 hosting the primary application and the secondary application server 106 hosting one or more secondary applications associated with primary application may include, but are not limited to, mail servers, print servers, web servers, game servers, and application servers. In an embodiment of the present invention as shown in FIG. 1, the primary application is the application under error and failure prediction. The primary application and the one or more secondary applications are configured to provide one or more functionalities. The one or more functionalities of the primary application and secondary application are exposed as one or more services in a service oriented architecture. The primary application is dependent on software components, resource components and user inputs to provide a desired functionality. In an exemplary embodiment of the present invention, the software components may include, but are not limited to, one or more services included by the primary application, one or more secondary applications associated with the primary application, one or more services associated with each of the one or more secondary applications, and service routine calls. Further, examples of resource components may include, but are not limited to, computing facility and storage. In an exemplary embodiment of the present invention, the primary application is dependent on the one or more secondary applications to provide one or more functionalities as required in response to one or more user requests. In another embodiment of the present invention, the primary application may be a set of multiple web services, where each web service is hosted by one or more servers orchestrated to produce desired functionality.

In an exemplary embodiment of the present invention, the primary application server 104 comprises an application execution engine 104b a process monitoring and logging engine 104c and one or more resource components (not shown).

The application execution engine 104b further comprises a mapping unit (not shown), a resource allocation unit (not shown) and a resource monitoring unit (not shown). In an exemplary embodiment of the present invention, the application execution engine 104b is configured to receive one or more user requests initiated external to the application environment via the application gateway 104a. Each user request is representative of a functionality required by the user from the primary application. The application execution engine 104b is configured to monitor availability of the one or more resource components via the resource monitoring unit (not shown). Further, the application execution engine 104b is configured to invoke one or more secondary applications associated with the primary application in a sequence defined by the application management subsystem 108 or in a predefined sequence via the mapping unit (not shown). The predefined sequence is representative of the sequence defined by a developer during the design of the primary application. The application management subsystem 108 is further configured to allocate the available one or more resource components for execution of the secondary applications associated with the primary application.

In an exemplary embodiment of the present invention, the process monitoring and logging engine 104c is configured to monitor the execution of the primary application. In particular, the process monitoring and logging engine 104c monitors one or more sequence of events which includes execution sequence of the one or more associated software components and resource components, one or more secondary applications executed to complete one or more user requests, user request data, execution sequence of the secondary applications, failure incidents of the primary application, error incidents of the associated software components and resource components (as described in para 20) during execution of the primary application. In an exemplary embodiment of the present invention, the user request data includes, but is not limited to, type of user requests, number of user requests and the users associated with the requests. Further, the process monitoring and logging engine 104c stores said one or more sequence of events and a user request data in a database 118 for further analysis and use.

In an exemplary embodiment of the present invention, as shown in FIG. 1, the application management subsystem 108 interfaces with the primary application server 104 to retrieve the one or more sequence of events and the user request data. Further, the application management subsystem 108 interfaces with the secondary application server 106 to retrieve status of the one or more secondary applications and associated services. The application management subsystem 108 comprises an application management engine 112, a processor 114 and a memory 116. The application management engine 112 is a self-learning engine configured to convert one or more sequence of events into timestamped event logs, extract event patterns from the timestamped event logs, identify one or more execution sequences of the associated software components to complete one or more user requests from extraneous environment, and understand the structural and run time behavior of the associated software components which lead to their operational errors and failure. Further, the application management engine 112 identifies predefined errors also known as design time errors and actual errors during execution of the primary application. In an exemplary embodiment of the present invention, the predefined errors are representative of errors that are anticipated to occur during application execution in isolation or while interacting with associated software components. The predefined errors are identified using error codes defined by the application developer during design time. Examples of predefined errors include, but are not limited to, connection "time out" and "memory full". In an exemplary embodiment of the present invention, the actual errors are representative of errors which are not anticipated during design time by the developers. Actual errors mostly occur at run time due to unanticipated working conditions which are extraneous or intrinsic to the application. Actual errors are mostly represented as "unknown" error code. Examples of actual errors may include, but are not limited to "dead lock" and "live lock".

The application management engine 112 models the associated software components and resource components required for the execution of the primary application. Furthermore, the application management engine 112 provides critical decisions over the performance of the applications. In particular, the application management engine 112, acts as decision support which monitors the quality of performance of the primary application and associated components. Further the application management engine 112 suggests action items for deviation in performance, quality or both.

In various embodiments of the present invention, the application management engine 112 is configured to convert said one or more sequence of events and the user request data into timestamped event logs by using one or more parsing techniques. Further, the application management engine 112 is configured to extract data from the retrieved timestamped event logs. In an exemplary embodiment of the present invention, the data includes but is not limited to application Id, service Id, user Id, host, error information, resource information, user request data and frequently used execution sequences of associated software components. In an exemplary embodiment of the present invention, the user request data includes, but is not limited to, type of user requests, number of user requests and the users associated with the requests. In an embodiment of the present invention, the error information includes cascading effect of one or more errors on the associated applications, frequent errors, error description and associated error id. In an exemplary embodiment of the present invention, application management engine 112, derives error id from error description through categorization based on error description similarity and salience. In particular, error description is mapped to feature vectors, where the feature vectors are representative of frequent terms and sequence of terms on historical data. The application management engine 112 parses by creating clusters on similar feature vectors to tag one or more error descriptions with respective error id.

The application management engine 112 is further configured to model one or more user requests based on arrival time and required functionality using the information extracted from the timestamped event logs. In operation, in an exemplary embodiment of the present invention, the primary application server 104 executes the primary application in response to one or more user requests received via the application gateway 104a. The user may be a human or an associated application. Every user request arriving at application gateway 104a is logged by the primary application server 104. The application management engine 112 extracts the user request data from the timestamped events logs. The application management engine 112, characterizes arrival pattern of multiple user requests from the user request data. In operation, the application management engine 112 characterizes arrival pattern by computing multivariate distributional properties of interarrival times of multiple user requests along with user information using non-homogeneous time-varying stochastic process algorithms and ensembling methods. Thereafter, the user requests are modelled based on time of arrival of the user requests and the required functionality.

Further, the application management engine 112 is configured to create an execution sequence of associated software components based on the extracted timestamped event logs. In particular, the primary application is dependent on associated software components to accomplish one or more objectives. In an exemplary embodiment of the present invention, software components may include, but are not limited to, one or more services included by the primary application, the one or more secondary applications associated with the primary application, one or more services associated with each of the one or more secondary applications, and service routine calls. Examples of services may include but are not limited to be standard software services such as remote procedure calls, messaging, computing scripts, data handling scripts, and database services. The application management engine 112 maps each user request onto a sequence of software components that need to be executed in an order to complete respective user requests. This helps to proactively and accurately assess possible execution of associated software components given multiple user requests at any point of time on the primary application server 104. In operation in an embodiment of the present invention, the application management engine 112 extracts and analyses one or more frequent and longest patterns of execution sequences associated with each of the one or more user requests desiring same functionality. The application management engine 112 extracts and analyses one or more frequent and longest patterns from the timestamped event logs using a state-machine algorithm on cyclic weighted directed graph. Extracting frequent and longest patterns using the state-machine algorithm on cyclic weighted directed graph reduces processing time and provides better accuracy as compared with traditional methods of sequence extraction like dynamic programming and Markov models. In particular, nodes of the graph (not shown) represent associated software components of the primary application and the edges represent frequency of that particular sequence of software components in response to one or more user requests desiring same functionality. The application management engine 112 converts one or more execution sequences of associated software components to directed weighted cyclic graph by connecting every component node with all subsequent component nodes in the execution sequence. Further, the application management engine 112 uses a graph traversal technique to identify frequent and longest patterns of execution sequence. In operation, the graph traversal technique includes determining next node to traverse based on longest reachability of a node to the end nodes of the graph and trimming and storing relevant sequences to enable next traversals until subsequent traversals reach one of the end nodes or below frequency threshold. The one or more graph traversals represent longest frequent sequence of associated software components. Further, the application management engine 112 analyses logical dependency between the associated software components. Subsequently, the application management engine 112 defines an execution sequence of the associated software components for respective user requests based on respective one or more longest frequent patterns. The execution sequence is representative of an order of execution of the software components associated with the primary application for a user request.

For example: A-B-C-D; A-C-D; and A-B-E are three sequences of software components extracted from the time stamped event logs to complete a request, where A, B, C, D and E are the software components. In the example the frequency of occurrence of sequences A-B-C-D; A-C-D; and A-B-E are 2, 10 and 2 respectively. The state machine algorithm derives the frequent and longest sequence of the software components from the three sequences. In particular, frequency of occurrence of A-B is 4 and frequency of occurrence of A-C-D is 12 in the three sequences. Further, element A occurs in all the three sequences and the frequency of occurrence of element A is 14. Furthermore, A-B-C-D is determined as the longest pattern with a low frequency of 2. It is to be noted that although, A is the most frequent and A-B-C-D is the longest, these cannot be categorized as patterns necessary to complete the request. Therefore, the evaluated information is processed using the state machine algorithm on cyclic weighted graphs and A-C-D which occurs 12 times is selected as the longest frequent pattern associated with a request desiring same functionality.

In an exemplary embodiment of the present invention, the primary application is a loan approval application. The loan approval application provides one or more functionalities such as creation of customer profiles, approving loan amount etc. The loan approval application is dependent on a set of software services to provide one or more functionalities based on the type of functionality requested. In the exemplary embodiment of the present invention, the associated software services include customer information service, customer credentials validation service, loan amount verification service, authentication and approval service and report generation service. The associated software services may be hosted by a single server or multiple servers orchestrated to produce an output. The execution sequence for a loan approval request refers to the order of execution of said associated services. The application management engine 112 defines the execution sequence of said services based on the analysis of the longest frequent pattern of sequence identified from the timestamped event logs and the number of errors during execution of a particular sequence.

Furthermore, the application management engine 112, is configured to generate an execution scheme of the associated software components based on the modelled user requests, the execution sequence of associated software components and the data extracted from the timestamped event logs. As already described above, the extracted data includes but is not limited to application Id, service Id, user Id, host, error information, resource information, user request data and frequently used execution sequences of associated software components. Further, the application management engine 112 prioritizes execution of the associated software components for multiple user requests at a time based on the modelled user requests, resource status and execution sequence of the associated software components. In particular, the application management engine 112, extracts information such as resource availability and loading, distribution of other services to be executed and time remaining to execute respective requests from the modelled user requests, the resource status and execution sequence of the associated software components. The application management engine 112 generates the execution scheme by scheduling the allocation of resources for executing the associated software components based on the resource availability and loading, distribution of other software components to be executed and time remaining to execute respective requests. The execution scheme is representative of a schedule for execution of each of the associated software components across multiple user requests in the respective execution sequence. The multiple user requests may be associated with the same functionality of the primary application or different functionality of the primary application. The execution scheme facilitates managing of concurrent and/or multiple user request by effective utilization of resources.

In the exemplary embodiment of the present invention, where the primary application is a loan approval application, there may be multiple user requests desiring same or different functionalities of the primary application at a time. In the exemplary embodiment of the present invention, the associated software services include customer information service, customer credentials validation service, loan amount verification service, authentication and approval service and report generation service. The execution sequence for a customer profile request may include customer information service and customer credential validation service. The execution sequence for a loan approval request may include customer information service, customer credential validations service etc. The application management engine 112 prioritizes execution of the associated services for multiple user requests at a time requiring one or more same software services.

Yet further, the application management engine 112 is configured to predict the propensity of failure of the primary application based on the timestamped event logs, the user request data, execution sequence of the associated software components, and execution scheme of the primary application by using a holistic technique. In operation, the application management engine 112 models the set of errors using the error information in the timestamped event logs. The application management engine 112 models the pathways of error cascades within the context of application operation and performance using aforementioned state-machine algorithm on cyclic graph. The application management engine 112 predicts resource usage patterns of the associated software components based on the timestamped event logs using temporal multivariate distributional techniques. Further, the application management engine 112 is configured to accurately predict resource availability based on the modelled user requests and the execution sequence of associated software components. The application management engine 112 predicts propensity of failure of the primary application based on the identified error cascades, predicted resource usage pattern and the execution by using the holistic technique. In an exemplary embodiment of the present invention, the holistic technique is representative of simulation that accurately predicts application failures and synthesizes execution log for future. The holistic technique of the present invention uses intelligence extracted from the event logs to reduce downtime caused due to application and/or infrastructure failures by proactively simulating errors, and removes recurrent incidents in the network by redesign, thereby reducing overall management efforts of application infrastructure. Finally, the application management engine 112 is configured to provide preventive maintenance measures by analyzing the predicted failures and actual failures.

In various embodiments of the present invention, the application management engine 112 has multiple units which work in conjunction with each other for predicting errors and failures in the primary application and providing preventive maintenance measures. The various units of the application management engine 112 are operated via the processor 114 specifically programmed to execute instructions stored in the memory 116 for executing respective functionalities of the units of application management engine 112 in accordance with various embodiments of the present invention.

In an embodiment of the present invention, the application management subsystem 108 may be integrated with the primary application server. In said embodiment of the present invention, the functionalities of the application management subsystem 108 may be monitored by a user via terminal device through a user interface.

In another embodiment of the present invention, the application management subsystem 108 may be implemented in a cloud computing architecture in which data, applications, services, and other resources are stored and delivered through shared data-centers. In an exemplary embodiment of the present invention, the functionalities of the application management subsystem 108 are delivered to the primary application server 104 as software as a service (SAAS).

Figure 2:
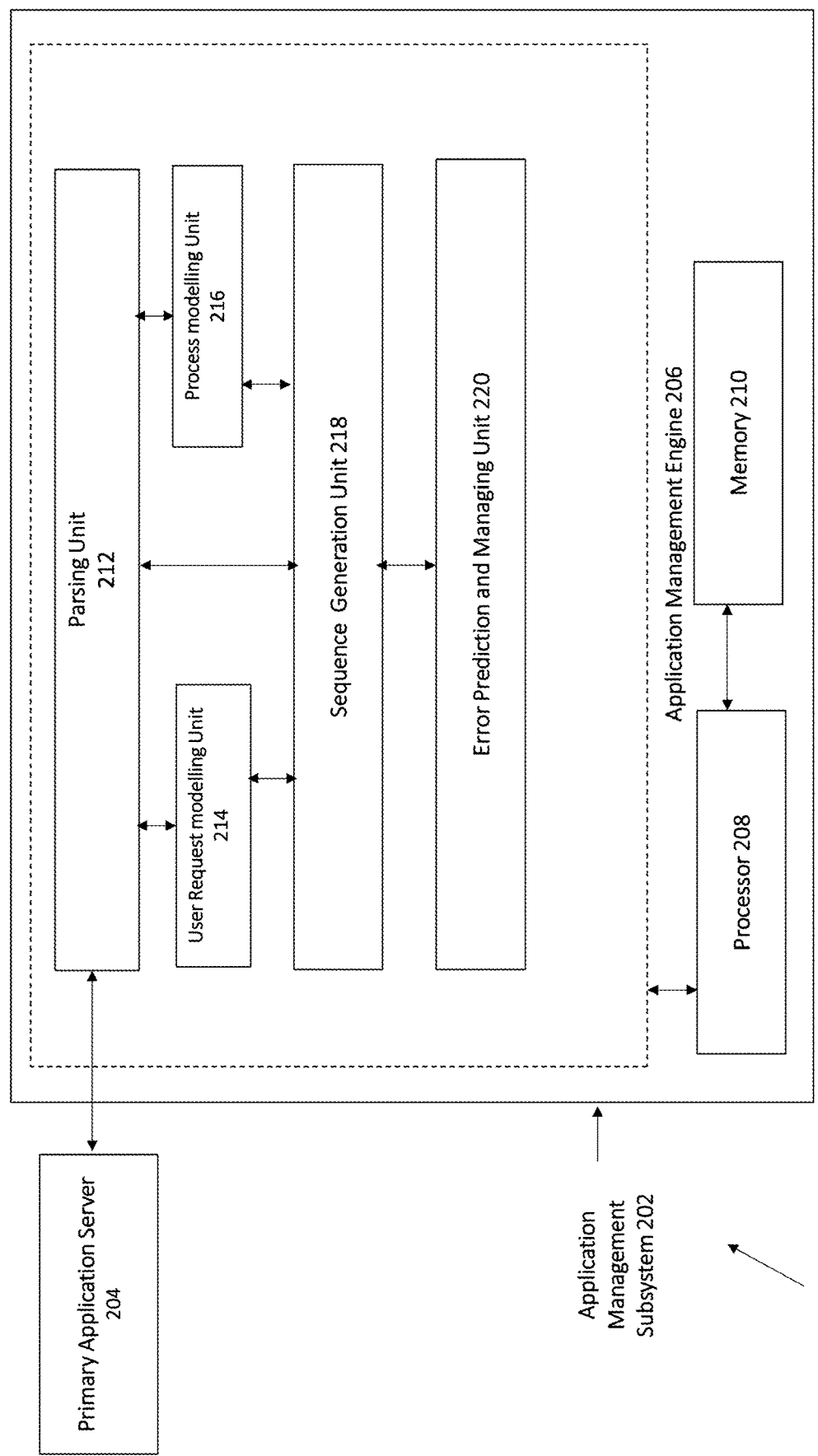
FIG. 2 is a detailed block diagram of an application management subsystem for predicting errors and failures in an application and providing preventive maintenance measures, in accordance with various embodiments of the present invention.

FIG. 2 is a detailed block diagram of an application management subsystem for predicting errors and failures in an application and providing preventive maintenance measures, in accordance with various embodiments of the present invention. The application management subsystem 202 interfaces with the primary application server 204 to retrieve the one or more sequence of events and user request data. Further, the application management subsystem 202 interfaces with the secondary application server (as shown in FIG. 1) to retrieve status of the one or more secondary applications and associated services. The application management subsystem 202 comprises an application management engine 206, a processor 208 and a memory 210.

In an embodiment of the present invention, the application management engine 206 comprises a parsing unit 212, a user request modelling unit 214, a process modelling unit 216, a sequence generation unit 218, and an error prediction and managing unit 220.

The parsing unit 212 is configured to interact with the primary application server 204 to retrieve one or more sequence of events and the user request data. The parsing unit 212 is further configured to convert said sequence of events and the user request data into timestamped event logs by using one or more parsing techniques. As already described with reference to FIG. 1 in para 24, the one or more sequences of events include execution sequence of the one or more associated software components and resource components, one or more secondary applications executed to complete one or more user requests, user request data, execution sequence of the secondary applications, failure incidents of the primary application, error incidents of the associated software components and resource components (as described in para 20) during execution of the primary application. Further, the parsing unit 212 is configured to extract data from the retrieved timestamped event logs. In an exemplary embodiment of the present invention, the data includes but is not limited to, application Id, service Id, user Id, host, error information, resource information, user request data and frequently used execution sequences of associated software components. In an exemplary embodiment of the present invention, the user request data includes, but is not limited to, type of user requests, number of user requests and the users associated with the requests. In an embodiment of the present invention, the error information includes cascading effect of one or more errors on the associated applications, frequent errors, error description and associated error id. In an exemplary embodiment of the present invention, the parsing unit 212, derives the error id from error description through categorization based on description similarity and salience. In particular, error description is mapped to feature vectors, where the feature vectors are representative of frequent terms and sequence of terms on historical data. The parsing unit 212, parses by creating clusters on similar feature vectors to tag one or more error descriptions with respective error id.

The user request modelling unit 214 is configured to receive the extracted data from the parsing unit 212 and models multiple user requests based on the arrival time and required functionality using the data extracted from the timestamped event logs. In operation, in an exemplary embodiment of the present invention, the primary application server 204 executes the primary application in response to one or more user requests received via the application gateway 104a (not shown). The user may be a human or an associated application. Every user request arriving at the application gateway is logged by the primary application server 204 (as explained with reference to FIG. 1 in para 23). Thereafter, the user request modelling unit 214 extracts the user request data from the timestamped event logs. Further, the user request modelling unit 214, characterizes arrival pattern of each of the multiple user requests from user request data. In operation, the user request modelling unit 214 characterizes arrival pattern by computing multivariate distributional properties of interarrival times of multiple user requests along with user information using non-homogeneous time-varying stochastic process algorithms and ensembling methods. Further, the user request are modelled based on time of arrival of the user requests and the required functionality.

The process modelling unit 216 is configured to receive the extracted data from the parsing unit 212 and create an execution sequence of the associated software components using the generated timestamped event logs. In various embodiments of the present invention, the primary application is dependent on the associated software components to accomplish one or more objectives. In an exemplary embodiment of the present invention, software components may include, but are not limited to one or more services comprised by the primary application, the one or more secondary applications associated with the primary application, one or more services associated with each of the one or more secondary applications, and service routine calls. The process modelling unit 216 maps each user request onto a sequence of software components that need to be executed in an order to complete respective user requests. This helps to proactively and accurately assess possible execution of associated software components given multiple user requests at any point of time on the primary application server 204.

In operation in an embodiment of the present invention, the process modelling unit 216 extracts and analyses one or more frequent and longest patterns of execution sequences associated with each of the one or more user requests desiring same functionality. The process modelling unit 216 extracts and analyses one or more frequent and longest patterns from the timestamped event logs using a state-machine algorithm on cyclic weighted directed graph. Extracting frequent and longest patterns using the state-machine algorithm on cyclic weighted directed graph reduces processing time and provides better accuracy as compared with traditional methods of sequence extraction like dynamic programming and Markov models. In particular, nodes of the graph (not shown) represent associated software components of the primary application and edges represent frequency of that particular sequence of software components in response to one or more user requests desiring same functionality. The process modelling unit 216 converts one or more execution sequences of associated software components to directed weighted cyclic graph by connecting every component node with all subsequent component nodes in the execution sequence. Further, the process modelling unit 216 uses a graph traversal technique to identify frequent and longest patterns of execution sequence. In operation, the graph traversal technique includes determining next node to traverse based on longest reachability of a node to the end nodes of the graph and trimming and storing relevant sequences to enable next traversals until subsequent traversals reach one of the end nodes or below frequency threshold. The one or more graph traversals represent longest frequent sequence of associated software components. Further, the process modelling unit 216 analyses logical dependency between the associated software components. Subsequently, the process modelling unit 216 defines an execution sequence of the associated software components for respective user requests based on respective one or more longest frequent patterns. The execution sequence is representative of an order of execution of the software components associated with the primary application for a user request.

For example: A-B-C-D; A-C-D; and A-B-E are three sequences of software components extracted from the time stamped event logs to complete a request, where A, B, C, D and E are the software components. In the example, the frequency of occurrence of sequences A-B-C-D; A-C-D; and A-B-E are 2, 10 and 2 respectively. The state machine algorithm derives the frequent and longest sequence of the software components from the three sequences. In particular, frequency of occurrence of A-B is 4 and frequency of occurrence of A-C-D is 12 in the three sequences. Further, element A occurs in all the three sequences and the frequency of occurrence of element A is 14. Furthermore, A-B-C-D is determined as the longest pattern with a low frequency of 2. It is to be noted that although, A is the most frequent and A-B-C-D is the longest, these cannot be categorized as patterns necessary to complete the request. Therefore, the evaluated information is processed using the state machine algorithm on cyclic weighted graphs and A-C-D which occurs 12 times is selected as the longest frequent pattern associated with a request desiring same functionality.

Figure 2A:
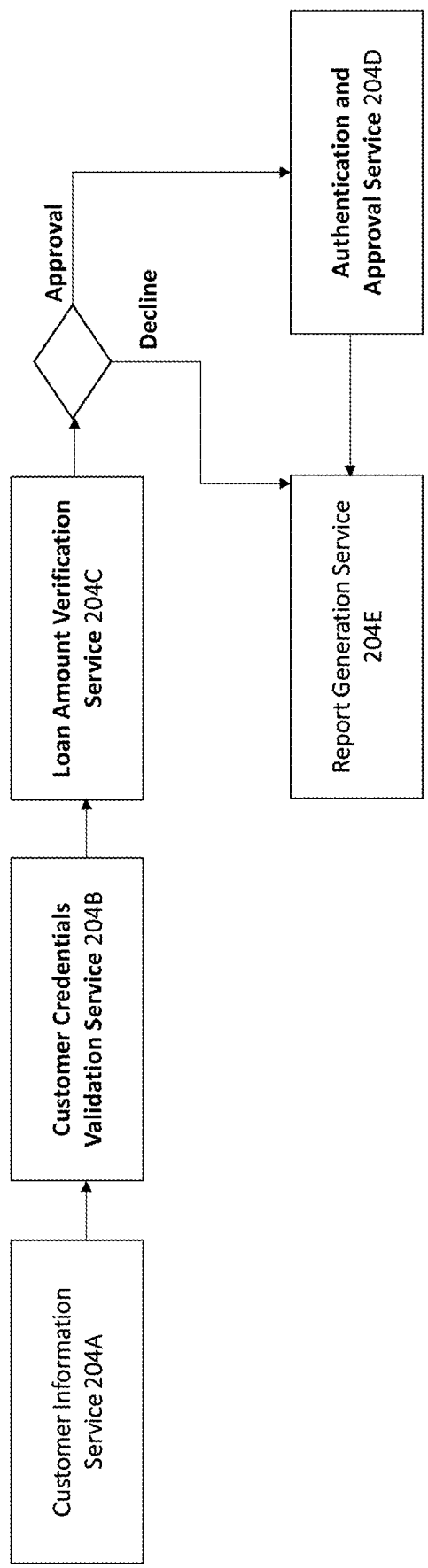
FIG. 2A is an execution sequence of software services associated with a loan approval application, in accordance with an exemplary embodiment of the present invention.

In an exemplary embodiment of the present invention, the primary application is a loan approval application. The loan approval application provides one or more functionalities such as creation of customer profiles, approving loan amount etc. The loan approval application is dependent on a set of software services to provide one or more functionalities based on the type of functionality requested. In the exemplary embodiment of the present invention, the associated services may include customer information service 204A, customer credentials validation service 204B, loan amount verification service 204C, authentication and approval service 204D and report generation service 204E. The associated software services may be hosted by a single server or multiple servers orchestrated to produce an output. The execution sequence for a loan approval request refers to the order of execution of said associated services. The process modeling unit 216 defines the execution sequence for said services as shown in FIG. 2A for a loan approval request. The defined execution sequence is based on the analysis of the longest frequent pattern of sequence identified from the timestamped event logs and the number of errors during execution of a particular sequence.

The sequence generation unit 218, is configured to receive the modelled requests and the execution sequence of associated software components from the user request modeling unit 214 and the process modelling unit 216 respectively. The sequence generation unit 218 receives extracted data from the parsing unit 212 and retrieves the status of the resource components in real time from the primary application server 204 via the parsing unit 212. Further, the sequence generation unit 218, retrieves the status of the associated software components, particularly the status of the one or more secondary applications from the secondary application server (not shown). As already described above, the extracted data includes, but is not limited to, application Id, service Id, user Id, host, error information, resource information, user request data and frequently used execution sequences of associated software components.

Further, the sequence generation unit 218 prioritizes execution of the associated software components for multiple user requests at a time based on the modelled user requests, resource status and execution sequence of the associated software components. In particular, the sequence generation unit 218, extracts information such as resource availability and loading, distribution of other services to be executed and time remaining to execute respective requests from the modelled user requests, the resource status and execution sequence of the associated software components. The sequence generation unit 218 generates the execution scheme by scheduling the allocation of resources for executing the associated software components based on the resource availability and loading, distribution of other software components to be executed and time remaining to execute respective requests. The execution scheme is representative of a schedule for execution of each of the associated software components across multiple user requests in the respective execution sequence. The multiple user requests may be associated with the same functionality of the primary application or different functionality of the primary application. The execution scheme facilitates managing of concurrent and/or multiple user request by effective utilization of resources.

In the exemplary embodiment of the present invention, where the primary application is a loan approval application, there may be multiple user requests desiring same or different functionalities of the primary application at a time. In the exemplary embodiment of the present invention, the associated software services include customer information service, customer credentials validation service, loan amount verification service, authentication and approval service and report generation service. The execution sequence for a customer profile request may include customer information service and customer credential validation service. The execution sequence for a loan approval request may include customer information service 204A, customer credentials validation service 204B, loan amount verification service 204C, authentication and approval service 204D and report generation service 204E. The sequence generation unit 218 prioritizes execution of the associated services for multiple user requests at a time requiring one or more same software services. The sequence generation unit 218, schedules the time of execution of each of the associated services based on the number of user requests and resource availability.

The error prediction and managing unit 220 is configured to receive the data extracted from the timestamped event logs, the modelled user requests, the execution sequence, and the execution scheme from the sequence generation unit 218. Further, the error prediction and managing unit 220 is configured to predict the propensity of failure of the primary application based on the timestamped event logs, user requests, execution sequence of associated applications, and execution scheme of the primary application by using a holistic technique. In operation, the error prediction and managing unit 220 models the set of errors using the error information in the timestamped event logs. The error prediction and managing unit 220 models the pathways of error cascades within the context of application operation and performance using aforementioned state-machine algorithm on cyclic graph. The error prediction and managing unit 220 predicts resource usage patterns of the associated software components based on the timestamped event logs using temporal multivariate distributional techniques. Further, the error prediction and managing unit 220 is configured to accurately predict resource availability based on the modelled user requests and the execution sequence of associated software components. The error prediction and managing unit 220 predicts propensity of failure of the primary application based on the identified error cascades, predicted resource usage pattern and the execution by using the holistic technique. In an exemplary embodiment of the present invention, the holistic technique is representative of simulation that accurately predicts application failures and synthesizes execution log for future. The holistic technique of the present invention uses intelligence extracted from the event logs to reduce downtime caused due to application and/or infrastructure failures by proactively simulating errors, and removes recurrent incidents in the network by redesign, thereby reducing overall management efforts of application infrastructure. Further, the error prediction and managing unit 220 provides critical decisions over the performance of the primary application. In particular, the error prediction and managing unit 220, acts as a decision support which monitors the quality of performance of the primary applications and suggests action items for deviation in performance, quality or both. Finally, the error prediction and managing unit 220 provides preventive maintenance measures by analyzing the predicted failures and actual failures.

Figure 3:
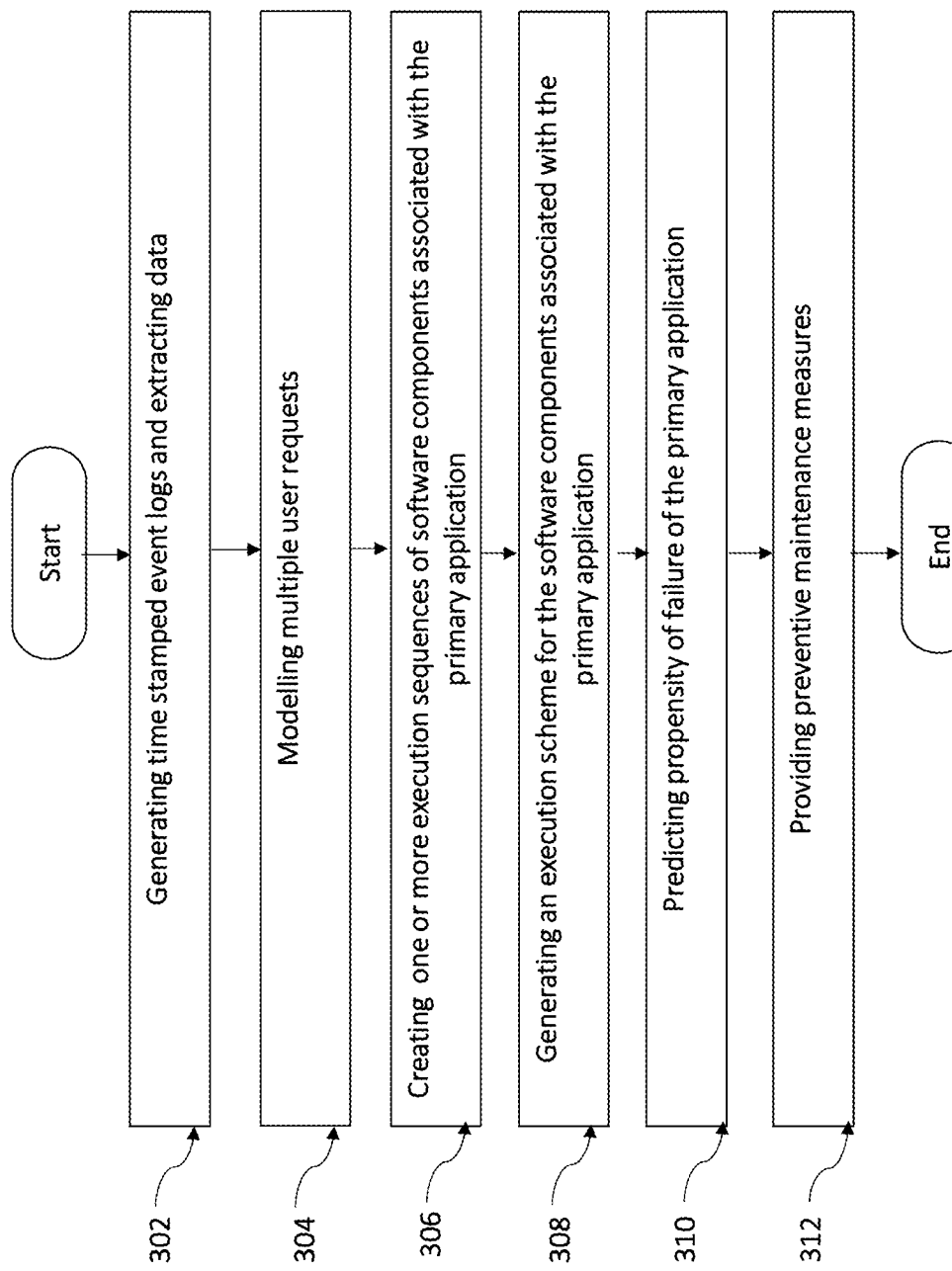
FIG. 3 is a flowchart illustrating a method for predicting errors and failures in an application and providing preventive maintenance measures thereof, in accordance with an embodiment of the present invention.

FIG. 3 is a flowchart illustrating a method for predicting errors and failures in an application and providing preventive maintenance measures thereof, in accordance with an embodiment of the present invention.

At step 302, timestamped event logs are generated and data is extracted. In an embodiment of the present invention, one or more sequence of events are retrieved from a primary application server hosting the primary application and are converted into the timestamped event logs by using one or more parsing techniques. The one or more sequence of events include, but are not limited to, execution sequence of the one or more associated software components and resource components, one or more secondary applications executed to complete one or more user requests, user request data, execution sequence of the secondary applications, failure incidents of the primary application, error incidents of the associated software components and resource components (as described in para 20) during execution of the primary application. Further, data is extracted from the retrieved timestamped event logs. In an exemplary embodiment of the present invention, the data includes, but is not limited to application Id, service Id, user Id, host, error information, resource information, user request data and frequently used execution sequences of associated software components. In an exemplary embodiment of the present invention, the user request data includes, but is not limited to type of user requests, number of user requests and the users associated with the requests. In an embodiment of the present invention, the error information includes cascading effect of one or more errors on the associated applications, frequent errors, error description and associated error id. In an exemplary embodiment of the present invention, the error id is derived from error description through categorization based on error description similarity and salience. In particular error description is mapped to feature vectors, where features are frequent terms and sequence of terms on historical data. The one or more error descriptions are tagged with respective error id by clustering on similar feature vectors.

At step 304, multiple user requests are modelled. In an embodiment of the present invention, multiple user requests are modelled based on the arrival time and required functionality using the data extracted from the timestamped event logs. In operation, the primary application hosted by the primary application server is invoked by one or more user requests received via the application gateway 104*a*. The user may be a human or an associated application. Every user request arriving at application gateway is logged by the primary application server. The user request information from the timestamped event logs is extracted and arrival pattern of each of the multiple user requests is characterized from the user request data. In particular, arrival pattern is characterized by computing multivariate distributional properties of interarrival times of multiple user requests along with user information using non-homogeneous time-varying stochastic process algorithms and ensembling methods. Further, the user requests are modelled based on time of arrival of the user requests and functionality required.

At step 306, execution sequence of software components associated with the primary application is created. In an embodiment of the present invention, one or more execution sequences of the associated software components is created based on the data extracted from the timestamped event logs. In particular, the primary application is dependent on the associated software components to accomplish one or more objectives. In an exemplary embodiment of the present invention, software components may include, but are not limited to, one or more services included by the primary application, the one or more secondary applications associated with the primary application, one or more services associated with each of the one or more secondary applications, and service routine calls. Each user request is mapped onto a sequence of software components that need to be executed in an order to complete respective user requests.

In operation, in an embodiment of the present invention, one or more frequent and longest patterns of execution sequences associated with each of the one or more user requests desiring same functionality are extracted and analyzed. The one or more frequent and longest patterns are extracted and analysed from the timestamped event logs using a state-machine algorithm on cyclic weighted directed graph. Extracting frequent and longest patterns using the state-machine algorithm on cyclic weighted directed graph reduces processing time and provides better accuracy as compared to traditional methods of sequence extraction like dynamic programming and Markov models. In particular, nodes of the graph (not shown) represent associated software components of the primary application and edges represent frequency of that particular sequence of software components in response to one or more user requests desiring same functionality. The one or more execution sequences of associated software components are converted to directed weighted cyclic graph by connecting every component node with all subsequent component nodes in the execution sequence. Further, a graph traversal technique is used to identify frequent and longest patterns of execution sequence. In operation, the graph traversal technique includes determining next node to traverse based on longest reachability of a node to the end nodes of the graph and trimming and storing relevant sequences to enable next traversals until subsequent traversals reach one of the end nodes or below frequency threshold. The one or more graph traversals represent longest frequent sequence of associated software components. Further, logical dependency between the associated software components is analysed. Subsequently, an execution sequence of the associated software components for respective user requests is defined based on respective one or more longest frequent patterns. The execution sequence is representative of an order of execution of the software components associated with the primary application for a user request.

For example: A-B-C-D; A-C-D; and A-B-E are three sequences of software components extracted from the time stamped event logs to complete a request, where A, B, C, D and E are the software components. In the example, the frequency of occurrence of sequences A-B-C-D; A-C-D; and A-B-E are 2, 10 and 2 respectively. The state machine algorithm derives the frequent and longest sequence of the software components from the three sequences. In particular, frequency of occurrence of A-B is 4 and frequency of occurrence of A-C-D is 12 in the three sequences. Further, element A occurs in all the three sequences and the frequency of occurrence of element A is 14. Furthermore, A-B-C-D is determined as the longest pattern with a low frequency of 2. It is to be noted that although, A is the most frequent and A-B-C-D is the longest, these cannot be categorized as patterns necessary to complete the request. Therefore, the evaluated information is processed using the state machine algorithm on cyclic weighted graphs and A-C-D which occurs 12 times is selected as the longest frequent pattern associated with a request desiring same functionality.

In an exemplary embodiment of the present invention, the primary application is a loan approval application. The loan approval application provides one or more functionalities such as creation of customer profiles, approving loan amount etc. The loan approval application is dependent on a set of software services to provide one or more functionalities based on the type of functionality requested. In the exemplary embodiment of the present invention, the associated services may include customer information service 204A, customer credentials validation service 204B, loan amount verification service 204C, authentication and approval service 204D and report generation service 204E. The associated software services may be hosted by a single server or multiple servers orchestrated to produce an output. The execution sequence for a loan approval request refers to the order of execution of said associated services. The execution sequence is defined based on the analysis of the longest frequent pattern of sequence identified from the timestamped event logs and the number of errors during execution of a particular sequence.

At step 308, an execution scheme for the associated software components is generated. In an embodiment of the present invention, the execution scheme for the primary application is generated based on the modelled user requests, execution sequence of associated software components and resource status. In particular, the status of one or more resource components in real time is retrieved. Further, status of the associated software components, particularly the status of the one or more secondary applications is retrieved from a secondary application server.

Further, execution of the associated software components for multiple user requests at a time is prioritized based on the modelled user requests, the resource status and the execution sequence of the associated software components. In particular, information such as resource availability and loading, distribution of other services to be executed and time remaining to execute respective requests is extracted from the modelled user requests, the resource status and execution sequence of the associated software components. The execution scheme is generated by scheduling the allocation of resources for executing the associated software components based on the resource availability and loading, distribution of other software components to be executed and time remaining to execute respective requests. The execution scheme is representative of a schedule for execution of each of the associated software components across multiple user requests in the respective execution sequence. The multiple user requests may be associated with the same functionality of the primary application or different functionality of the primary application. The execution scheme facilitates managing of concurrent and/or multiple user request by effective utilization of resources.

At step 310, propensity of failure of the primary application is predicted. In an embodiment of the present invention, the propensity of failure of the primary application is predicted based on the timestamped event logs, the modelled user requests, the one or more execution sequences, the resource status and the execution scheme by using a holistic technique. Furthermore, the set of errors are modelled using the error information in the timestamped event logs. For instance: In the primary application the constituent services are associated in a timely manner and depends on the resources for their execution. An error or anomalous behavior in one or more services may impact the normal operation of associated services leading to a failure of the primary application. This phenomena of propagation of error from one entity to another entity is called the cascading effect of errors. The pathways of error cascades within the context of application operation and performance are modelled using state-machine algorithm on cyclic graph. The resource usage patterns of the associated software components are predicted based on the timestamped event logs using temporal multivariate distributional techniques. Further, resource availability is predicted based on the modelled user requests and the execution sequence of associated software components. The propensity of failure of the primary application is predicted based on the identified error cascades, predicted resource usage pattern and the execution by using the holistic technique. In an exemplary embodiment of the present invention, the holistic technique is representative of simulation that accurately predicts application failures and synthesizes execution log for future. The holistic technique of the present invention uses intelligence extracted from the event logs to reduce downtime caused due to application and/or infrastructure failures by proactively simulating errors, and removes recurrent incidents in the network by redesign, thereby reducing overall management efforts of application infrastructure. Further, critical decisions over the performance of the primary application are provided. Finally, preventive maintenance measures are provided by analyzing the predicted failures and actual failures at step 312.

Figure 4:
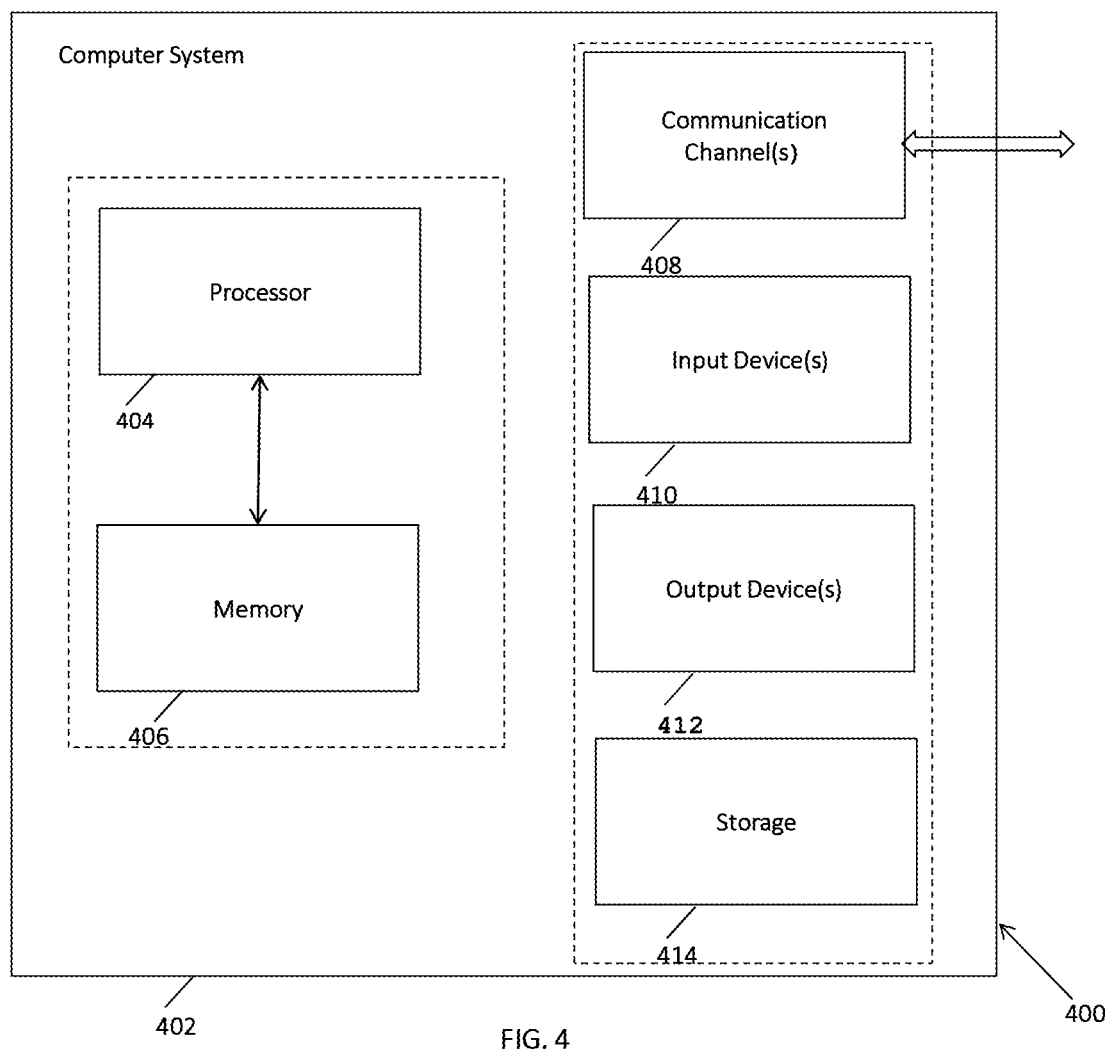
FIG. 4 illustrates an exemplary computer system in which various embodiments of the present invention may be implemented.

FIG. 4 illustrates an exemplary computer system in which various embodiments of the present invention may be implemented. The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for predicting actual errors and failures in a primary application in real-time and providing preventive maintenance measures, wherein the method is implemented by at least one processor executing program instructions stored in a memory, the method comprising:

generating, by the processor, timestamped event logs by converting one or more sequence of events during execution of the primary application using one or more parsing techniques, wherein the one or more sequence of events include execution sequence of software components and resource components associated with the primary application;

modelling, by the processor, multiple user requests, the multiple user requests are representative of a functionality desired from the primary application, wherein the multiple user requests are modelled based on an arrival time and required functionality associated with each user request using real-time data extracted from the timestamped event logs;

creating, by the processor, one or more execution sequences of the software components associated with the primary application based on the generated timestamped event logs, wherein the execution sequence comprises one or more frequent and longest patterns of execution sequences from the timestamped event logs;

generating, by the processor, an execution scheme for the software components associated with the primary application based on the modelled user requests, the execution sequence and a real-time status of resource components wherein generating the execution scheme comprises prioritizing execution of the associated software components for multiple user requests at a time based on the modelled user requests, retrieved status of the one or more resource components and software components associated with the primary application and the one or more execution sequences;

predicting, by the processor, a propensity of failure of the primary application based on the timestamped event logs, the modelled user requests, the one or more execution sequences, the real-time resource status and the execution scheme; and analyzing, by the processor, the predicted failures and actual failures extracted from the timestamped event logs and identify actual errors which occur at run-time during execution of the primary application to provide preventive maintenance measures.

2. The method as claimed in claim 1, wherein the timestamped event logs include application Id, service Id, user Id, host, error information, resource information, user request data and frequently used execution sequences of associated software components.

3. The method as claimed in claim 2, wherein the error information includes cascading effect of one or more errors on the associated applications, frequent errors, error description and associated error id.

4. The method as claimed in claim 2, wherein a set of errors are modelled using the error information in the timestamped event logs.

5. The method as claimed in claim 1, wherein each of the one or more execution sequences is representative of an order of execution of the software components associated with the primary application for respective user requests.

6. The method as claimed in claim 1, wherein the execution scheme is representative of a schedule for execution of each of the software components associated with the primary application across multiple user requests in the respective execution sequence.

7. The method as claimed in claim 1, wherein the software components associated with the primary application include one or more services comprised by the primary application, one or more secondary applications associated with the primary application, one or more services associated with each of the one or more secondary applications, and service routine calls.

8. The method as claimed in claim 7, wherein the services associated with the primary application are selected from remote procedure calls, messaging, computing scripts, data handling scripts, and database services.

9. The method as claimed in claim 1, wherein the resource components include computing facility and storage.

10. The method as claimed in claim 1, wherein the primary application is configured to provide one or more functionalities and is dependent on the one or more software components.

11. The method as claimed in claim 1, wherein the one or more sequence of events further include execution sequence of one or more secondary applications executed to complete one or more user requests, user request data, execution sequence of the secondary applications, failure incidents of the primary application, error incidents of the associated software components and resource components during execution of the primary application.

12. The method as claimed in claim 1, wherein the arrival pattern is characterized by computing multivariate distributional properties of interarrival times of multiple user requests along with user information using non-homogeneous time-varying stochastic process algorithms and ensembling methods.

13. The method as claimed in claim 1, wherein creating the execution sequence comprises: extracting and analyzing the one or more frequent and longest patterns of execution sequences from the timestamped event logs using a state-machine algorithm on cyclic weighted directed graph, wherein nodes of the graph represent the associated software components and edges represent frequency of respective execution sequence of software components in response to one or more user requests desiring same functionality, further wherein one or more execution sequences of the associated software components are converted to directed weighted cyclic graph by connecting every component node with all subsequent component nodes in the respective execution sequence;
   identifying one or more frequent and longest patterns of execution sequence using a graph traversal technique; and
   analysing logical dependency between the associated software components and defining the execution sequence of the associated software components for respective user requests based on respective one or more longest frequent patterns.

14. The method as claimed in claim 1, wherein the propensity of failure of the primary application is predicted using a holistic technique, the holistic technique includes using intelligence extracted from the timestamped event logs to reduce downtime caused due to application failures by proactively simulating errors, and removing recurrent incidents in the network by redesign, thereby reducing overall management efforts of application infrastructure.

15. A system for predicting actual errors and failures in a primary application in real-time and providing preventive maintenance measures, wherein the system interfaces with a primary application server hosting the primary application, the system comprising: a memory storing program instructions; a processor configured to execute program instructions stored in the memory; and an application management engine in communication with the processor and configured to:
   generate timestamped event logs by converting one or more sequence of events during execution of the primary application using one or more parsing techniques, wherein the one or more sequence of events include execution sequence of software components and resource components associated with the primary application;
   model multiple user requests, the multiple user requests are representative of a functionality desired from the primary application, wherein the multiple user requests are modelled based on an arrival time and required functionality associated with each user request using real-time data extracted from the timestamped event logs;
   create one or more execution sequences of the software components associated with the primary application based on the generated timestamped event logs, wherein the execution sequence comprises one or more frequent and longest patterns of execution sequences from the timestamped event logs;
   generate an execution scheme for the software components associated with the primary application based on the modelled user requests, the execution sequence and a real-time status of resource components, wherein the generated execution scheme comprises prioritized execution of the associated software components for multiple user requests at a time based on the modelled user requests, retrieved status of the one or more resource components and software components associated with the primary application and the one or more execution sequences;
   predict a propensity of failure of the primary application based on the timestamped event logs, the modelled user requests, the one or more execution sequences, the real-time resource status and the execution scheme; and
   analyze the predicted failures and actual failures extracted from the timestamped event logs and identify actual errors which occur at run-time during execution of the primary application to provide preventive maintenance measures.

16. The system as claimed in claim 15, wherein the one or more sequence of events further include execution sequence of one or more secondary applications executed to complete one or more user requests, user request data, execution sequence of the secondary applications, failure incidents of the primary application, error incidents of the associated software components and resource components during execution of the primary application.

17. The system as claimed in claim 15, wherein the application management engine comprises a parsing unit in communication with the processor, said parsing unit configured to retrieve one or more sequence of events from the primary application server; convert said sequence of events into timestamped event logs using one or more parsing techniques; and extract data from the retrieved timestamped event logs, wherein the data includes application Id, service Id, user Id, host, error information, resource information, user request data and frequently used execution sequences of associated software components.

18. The system as claimed in claim 17, wherein the error information includes cascading effect of one or more errors on the associated applications, frequent errors, error description and associated error id.

19. The system as claimed in claim 15, wherein each of the one or more execution sequences is representative of an order of execution of the software components associated with the primary application for respective user requests.

20. The system as claimed in claim 15, wherein the execution scheme is representative of a schedule for execution of each of the software components associated with the primary application across multiple user requests in the respective execution sequence.

21. The system as claimed in claim 15, wherein the software components associated with the primary application include one or more services comprised by the primary application, one or more secondary applications associated with the primary application, one or more services associated with each of the one or more secondary applications, and service routine calls.

22. The system as claimed in claim 21, wherein the services associated with the primary application are selected from remote procedure calls, messaging, computing scripts, data handling scripts, and database services.

23. The system as claimed in claim 15, wherein the application management engine comprises a user request modelling unit in communication with the processor, said user request modelling unit configured to extract the user request data from the timestamped event logs and characterize the arrival pattern of each of the multiple user requests from the user request data, wherein the arrival pattern is characterized by computing multivariate distributional properties of interarrival times of multiple user requests along with user information using non-homogeneous time-varying stochastic process algorithms and ensembling methods.

24. The system as claimed in claim 15, wherein the application management engine comprises a process modelling unit in communication with the processor, said process modelling unit configured to create the execution sequence by: extracting and analyzing the one or more frequent and longest patterns of execution sequences from the timestamped event logs using a state-machine algorithm on cyclic weighted directed graph, wherein nodes of the graph represent associated software components and edges represent frequency of respective execution sequence of software components in response to one or more user requests desiring same functionality, further wherein one or more execution sequences of the associated software components are converted to directed weighted cyclic graph by connecting every component node with all subsequent component nodes in the respective execution sequence;
  identifying one or more frequent and longest patterns of execution sequence using a graph traversal technique; and
  analysing logical dependency between the associated software components and defining the execution sequence of the associated software components for respective user requests based on respective one or more longest frequent patterns.

25. The system as claimed in claim 15, wherein the application management engine comprises a sequence generation unit in communication with the processor, said sequence generation unit configured to generate the execution sequence by retrieving the status of the one or more resource components and software components associated with the primary application;
  and prioritizing the execution of the associated software components for multiple user requests at a time based on the modelled user requests, the retrieved status and the one or more execution sequences.

26. The system as claimed in claim 15, wherein the application management engine comprises an error prediction and managing unit in communication with the processor, said error prediction and managing unit configured to predict the propensity of failure of the primary application using a holistic technique, wherein the holistic technique includes using intelligence extracted from the timestamped event logs to reduce downtime caused due to application failures by proactively simulating errors, and removing recurrent incidents in the network by redesign, thereby reducing overall management efforts of application infrastructure.

27. A computer program product comprising:
  a non-transitory computer-readable medium having computer-readable program code stored thereon, the computer-readable program code comprising instructions that, when executed by a processor, cause the processor to:
  generate timestamped event logs by converting one or more sequence of events during execution of the primary application using one or more parsing techniques, wherein the one or more sequence of events include execution sequence of software components and resource components associated with the primary application;
  model multiple user requests, the multiple user requests are representative of a functionality desired from the primary application, wherein the multiple user requests are modelled based on an arrival time and required functionality associated with each user request using real-time data extracted from the timestamped event logs;
  create one or more execution sequences of the software components associated with the primary application based on the generated timestamped event logs, wherein the execution sequence comprises one or more frequent and longest patterns of execution sequences from the timestamped event logs;
  generate an execution scheme for the software components associated with the primary application based on the modelled user requests, the execution sequence and a real-time status of resource components, wherein generating the execution scheme comprises prioritizing execution of the associated software components for multiple user requests at a time based on the modelled user requests, retrieved status of the one or more resource components and software components associated with the primary application and the one or more execution sequences;
  predict a propensity of failure of the primary application based on the timestamped event logs, the modelled user requests, the one or more execution sequences, the real-time resource status and the execution scheme; and
  analyze the predicted failures and actual failures extracted from the timestamped event logs and identify actual errors which occur at run-time during execution of the primary application to provide preventive maintenance measures.

* * * * *